United States Patent
Fuchs

(10) Patent No.: US 9,495,305 B1
(45) Date of Patent: Nov. 15, 2016

(54) DETECTING POINTER ERRORS FOR MEMORY PROTECTION

(71) Applicant: David Fuchs, Palo Alto, CA (US)

(72) Inventor: David Fuchs, Palo Alto, CA (US)

(73) Assignee: David Fuchs, Palo Alto, CA (US)

( * ) Notice: Subject to any disclaimer, the term of this patent is extended or adjusted under 35 U.S.C. 154(b) by 351 days.

(21) Appl. No.: 14/062,162

(22) Filed: Oct. 24, 2013

Related U.S. Application Data

(60) Provisional application No. 61/722,082, filed on Nov. 2, 2012.

(51) Int. Cl.
  *G06F 12/00* (2006.01)
  *G06F 12/14* (2006.01)
  *G06F 12/08* (2016.01)
  *G06F 11/00* (2006.01)

(52) U.S. Cl.
  CPC ........ *G06F 12/1483* (2013.01); *G06F 12/0895* (2013.01); *G06F 11/00* (2013.01)

(58) Field of Classification Search
  CPC ............................ G06F 11/00; G06F 12/0895
  See application file for complete search history.

(56) References Cited

U.S. PATENT DOCUMENTS

| | | | |
|---|---|---|---|
| 6,578,122 B2 | 6/2003 | Beukema et al. | 711/163 |
| 7,673,345 B2 | 3/2010 | Cheng et al. | 726/26 |
| 7,761,676 B2 | 7/2010 | Doshi et al. | 711/163 |
| 8,006,055 B2 | 8/2011 | Waters et al. | 711/163 |
| 2007/0186055 A1 | 8/2007 | Jacobson et al. | 711/144 |
| 2008/0140968 A1 | 6/2008 | Doshi et al. | 711/163 |
| 2008/0276051 A1 | 11/2008 | Renno | 711/154 |
| 2009/0006757 A1* | 1/2009 | Singhal | G06F 12/0897 711/128 |
| 2009/0172341 A1 | 7/2009 | Durham et al. | 711/206 |

\* cited by examiner

*Primary Examiner* — Zachary K Huson
(74) *Attorney, Agent, or Firm* — Dov Rosenfeld; Inventek

(57) ABSTRACT

A method, a processing system, and a non-transitory computer-readable medium configured with instructions to carry out a method of determining access permission for or during dereferencing a memory address in an allocated portion of memory of a processing system. The method comprises: providing a pointer that has a tag field and a control-structure-pointer field; and entering content in the control-structure-pointer field to point to a control structure for the allocated portion of memory. The control structure's location or content indicates the portion of memory. The method assigning a tag value for the portion in the tag fields of the pointer and of the control structure. Determining access permission including ascertaining whether the contents of the tag fields of the pointer and of the control structure match.

20 Claims, 6 Drawing Sheets

DETECTING POINTER ERRORS FOR MEMORY PROTECTION

RELATED PATENT APPLICATIONS

This invention claims benefit of priority of U.S. Provisional Patent Application No. 61/722,082 to inventor Fuchs, titled DETECTING POINTER ERRORS FOR MEMORY PROTECTION, and filed 2 Nov. 2012. The contents of such U.S. Provisional Patent Application No. 61/722,082 are incorporated herein by reference.

FIELD OF THE INVENTION

The present disclosure relates generally to computers and their operation.

BACKGROUND

In executing programs on computers, pointers are often used as references by containing values that enable a program to indirectly access a particular datum such as a variable or a record in the computer's memory or in some other storage device. A reference refers to the datum, and accessing the datum is called dereferencing the reference. Pointers can have an intimate relationship to the underlying hardware in a computer. Pointers store an address of a memory location, e.g., an actual address, or more typically, a virtual address that is translated to an address by a memory management unit. Because pointers directly store an address instead of a value, inappropriate use of pointers can lead to undefined behavior in a program. For example, modern computers when executing a program include a heap, essentially the "free" memory available for storage of data that is to be used by a program, and a stack, e.g., for short-term use of data, e.g., for use by a function in a program for local variables from the time the function is called until the function returns to the entity that called it. When a portion of memory, e.g., of a heap or stack is allocated, the portion has an associated pointer that points to a location in the memory portion, e.g., by initially containing a starting address—possibly a virtual address—of the memory portion. In the case of a heap, pointer misuse is possible. One example is an out-of-bound pointer. For example, during program execution, pointer arithmetic may be carried out on a pointer, allocated for a memory portion, which leads to the pointer's pointing to a location in memory that is not within the allocated memory portion. Dereferencing the pointer, that is, accessing the memory pointed to by following the path to the memory location, e.g., the memory address pointed to by the pointer, then leads to an error. Another example is use of a dead pointer—a pointer that points to a memory that has been de-allocated. Stack problems include stack buffer overrun that can occur, for example, when a first function calls a second function. The first function has a first stack portion allocated to it and the second function has a second stack portion allocated to it. Normally, the second function may use only the second stack portion allocated to it. However, an error can occur when the second function somehow uses the first stack portion. Such a stack problem may go undetected until execution returns to the first calling function. As an example, suppose the second function sends back to the first calling function a pointer that is in the second stack's allocation. Returning to the first function causes the second stack to be de-allocated, thus causing the returned pointer to become a dead pointer. The possibility of such pointer errors has security implications. It is therefore important to protect memory by containing memory access.

One method of protecting memory by avoiding improper memory accesses by a pointer is to use part of the pointer, e.g., the first byte of a pointer, to enter, e.g., at the time of memory allocation, a tag value, sometimes called a color, which can be randomly or otherwise assigned at the time of allocation. Associated with heap memory is a provided tag array, with each tag array element sufficient to store a tag value, e.g., one byte, with one tag array element per unit of heap memory, e.g., per block. A block, e.g., may be 512 bytes of memory. At the time of memory allocation, the same tag value that is assigned to the pointer is also stored in each tag array element corresponding to the allocated memory portion. The tag value, for example, may be randomly assigned from all the unassigned values. Consider a tag that is one byte long. As an example, if a 34 KB portion of memory is allocated, a pointer is allocated, the tag field of the pointer is assigned a tag value, and, for a block size of 512 bytes, 68 locations of the tag array are tagged with the same tag value as the pointer for the allocation. Consider now an attempted access to a location in the allocated portion, i.e., an attempted dereference. A determination is made to ascertain whether the pointer that points to a location in the allocated portion has the same tag value as the tag array elements corresponding to the pointed to location, and access is prevented if these tag values are not the same. When deallocating the portion of memory, the tag value is freed up for reuse.

The approaches described in this BACKGROUND section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

DESCRIPTION OF EXAMPLE EMBODIMENTS

Figure 1A:
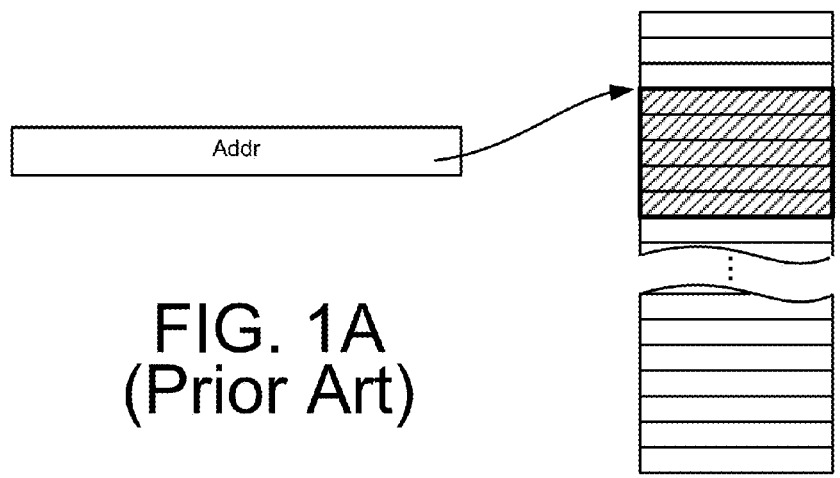
FIG. 1A illustrates conventional memory allocation in a computer.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.

Overview

Embodiments of the present invention include a method, a processing system, and a non-transitory computer-readable medium configured with instructions to carry out a method. The method includes determining access permission for or during dereferencing a memory address in an allocated portion of memory.

One embodiment includes a method in a processing system that includes a memory. The method comprises providing a pointer in a processing system, e.g., in the process of allocating a portion of memory. The pointer includes a tag field and a control-structure-pointer field. The method further comprises entering content in the control-structure-pointer field of the pointer so that the control-structure-pointer field points to a control structure for the allocated portion of memory. The control structure also has a tag field. The control structure's location or content is indicative of the location of the portion of memory. The method further comprises assigning a tag value for the portion of memory and entering the tag value in the tag fields of the pointer and of the control structure. Dereferencing a memory address in the allocated portion of memory, e.g., as part of the execution of an instruction that uses the pointer, includes determining access permission including ascertaining whether the contents of the tag fields of the pointer and of the control structure match.

One embodiment includes a processing system comprising at least one processor, a non-transitory computer-readable medium including a memory, and instructions in the non-transitory computer-readable medium. The instructions are configured, when executed, to cause the processing system to assign a tag value for a portion of memory that has been allocated and to enter the tag value for the portion of memory in a tag field included in a control structure. The control structure's location or content is indicative of the location of the portion of memory. The tag value is used to determine access permission to the portion of memory during execution of an instruction that uses a pointer provided by the allocation of the portion of memory. Determining access permission includes comparing the contents of a tag field in the pointer with the tag value entered in the tag field of the control structure, the pointer also including a control-structure-pointer field that points to the control structure.

In some versions, the pointer includes an offset field to provide carrying out pointer arithmetic during execution of an instruction that uses the pointer by assigning an offset value in the offset field to modify the indication of the location of the portion of memory by the offset value using the control structure's location or content.

One embodiment includes a processing system comprising a processor, a memory, and logic that is configured to cause the processing system to assign a tag value for a portion of the memory that has been allocated and to enter the tag value in a tag field included in a control structure. The control structure's location or content is indicative of the location of the portion of memory. In one version, the logic includes instructions that when executed carry out one or more steps that form an embodiment of the invention. In another version, at least some of the logic is realized by hardware. The tag value is used to determine access permission to a portion of memory during execution of an instruction of a computer program. The instruction uses a pointer provided by allocation of the portion of memory. The determining of access permission includes comparing the contents of a tag field in the pointer with the tag value entered in the tag field of the control structure. The pointer also includes a control-structure-pointer field that points to the control structure.

One embodiment includes a non-transitory machine-readable medium, e.g., a memory having stored therein instructions that when executed by a processor of a processing system that includes the memory, cause the processing system to carry a method. The method comprises a determining step carried out during, as a result of, or for executing an instruction by the processing system. The instruction uses a pointer for an allocated portion of memory and includes dereferencing of a memory address in the allocated portion. The pointer includes a tag field and a control-structure-pointer field. The determining step determines if a tag value in the tag field of the pointer matches a corresponding tag value entered in a corresponding tag field in a control structure. The control-structure-pointer field points to the control structure. The control structure's location or content is indicative of the location of the allocated portion of memory. The method comprises preventing access to the memory address if a match does not occur.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

FIG. 1A illustrates conventional memory allocation in a processing system, e.g., a computer during program execution. Allocating a portion of memory includes providing a pointer and including in the pointer a memory pointer quantity, e.g., an address denoted Addr for the allocated memory to point to a location in the portion of memory being allocated. The memory pointer quantity can contain an address to actual physical memory directly or to a virtual address which is translated to an address in physical memory via a memory management unit included in the processing system.

Figure 1B:
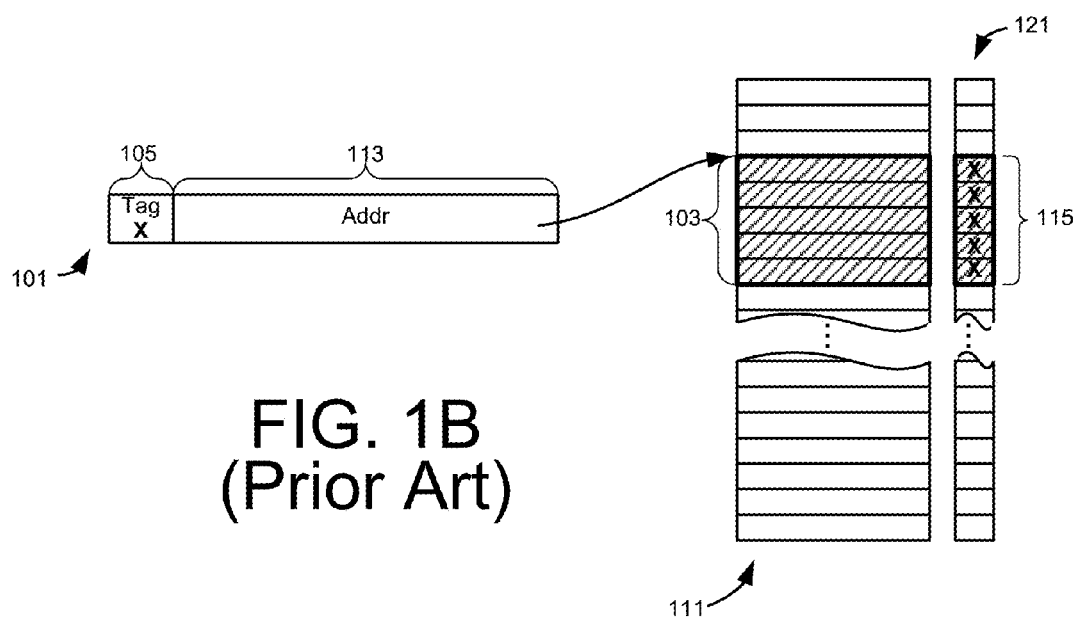
FIG. 1B illustrates memory allocation using a tag array to protect from improper memory reference.

FIG. 1B illustrates memory allocation using a tag array. Available memory, e.g., a heap or a stack 111 is available to be allocated and, e.g., is divided into blocks. A tag array 121 exists having an element for each block of memory in the heap (or stack in the case of a stack; a heap will be assumed). Allocating a portion 103 of memory in 111 includes allocating a pointer 101 to the memory. The pointer includes a tag field 105 for a tag and a memory-pointer field 113. Allocating the portion 103 also includes assigning a tag value shown as X for the allocated portion 103 in the tag field 105 of the pointer and the same tag value shown as X in each array element in a portion 115 corresponding to each unit of memory in the allocated portion 103 of memory. The allocation also includes including in the memory-pointer field 113 a memory pointer quantity denoted Addr for a location in the allocated memory 103 to point to the location in the portion of memory, e.g., to the starting address of 103. An attempted access to a location in the allocated portion 103 includes making a determination to ascertain whether the pointer 101 has the same tag value X in tag field 105 as the tag array element or elements corresponding to the pointed-to location. Access is prevented if these tag values are not the same.

Method and Non-Transitory Computer-Readable Medium Embodiments

Figure 2:
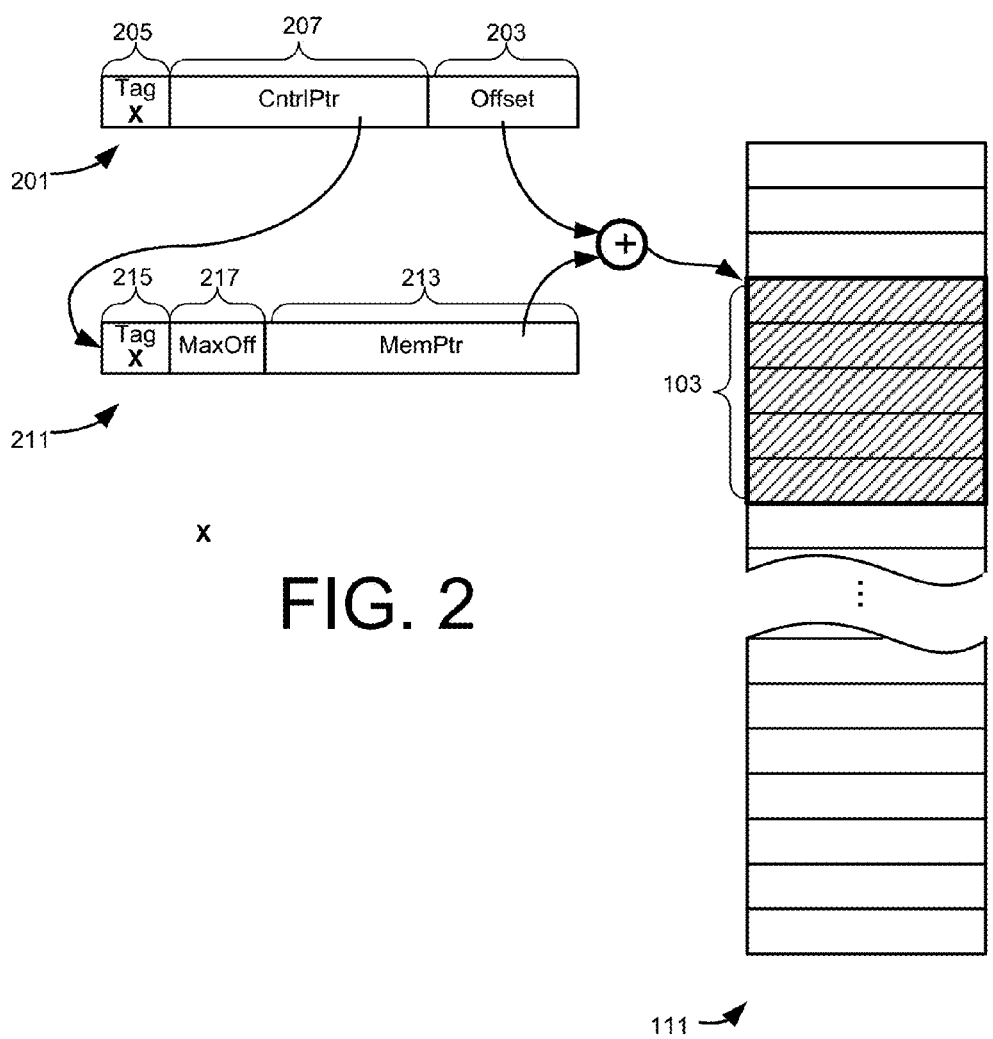
FIG. 2 is a simplified block diagram that shows elements of an embodiment of the present invention.

FIGS. 2 to 5 describe elements applicable to embodiments of methods that operate in a processing system that includes memory and at least one processor. Examples include methods of allocating a portion of memory of the processing system. The elements in FIG. 2 are also applicable to embodiments of a non-transitory computer-readable medium, such as a storage structure, e.g., a memory configured with instructions that when executed in a processing system that includes memory, carry out embodiments of methods of allocating a portion of memory of the processing system.

FIG. 2 shows elements applicable to such a method and computer-readable medium. Consider available memory 111, e.g., a heap or a stack. When a memory allocation is made for a portion 103 of memory during execution of a program by the processing system, a pointer structure 201 is provided for the allocated portion 103 of memory and a control structure 211 is provided for the allocated portion 103. The pointer structure 201 includes a field 205 for a tag, called a tag field, and a field 207 that points to the control structure 211. This field 207 is called the control-structure-pointer field and is denoted herein by CtrlPtr. The control structure 211 also includes a tag field 215 for a tag and a second field 213, called a memory-pointer field, denoted MemPtr, that has entered therein contents indicative of a location in the portion 103 of memory, e.g., that points directly or via a memory management unit to the location in the portion of memory. In one example embodiment, MemPtr field 213 initially points to the starting address of portion 103. In an embodiment of a processing system that uses virtual addresses and includes a memory management unit, MemPtr field 213 initially points to the virtual address of the start of portion 103.

In one embodiment, the tag field 205 and control-structure-pointer field CtrlPtr 207 are at the start of the pointer structure 201.

Allocating a portion of memory in 111 includes, in addition to providing the pointer structure 201 and the control structure 211 for the allocated portion 103 of memory, assigning a tag value, e.g., a value denoted X for the allocated portion 103, entering the assigned tag value X for the allocated portion 103 in both the tag field 205 of the pointer structure 201 and the tag field 215 of the control structure 211 for the allocated portion 203, and entering a memory pointer quantity, denoted Addr, for the allocated memory 203 into the MemPtr memory-pointer field 213 to point to a location in the portion 103 of memory. Note that just as in conventional memory allocation, the memory pointer field can point to an actual physical memory directly or can include a virtual memory address that eventually leads to a physical memory via a memory management unit in the processing system, e.g., the computer. A dereferencing of a location in the allocated portion 103 includes making a determination to ascertain whether the tag field 205 in the pointer structure 201 has the same tag value X as the tag field 215 of the control structure 211 corresponding to the pointed-to location. Access is prevented, and, in some embodiments, an exception is raised if these tag values are not the same. In one embodiment, the processing system includes a validator element that that is operative during dereferencing and that includes logic to ascertain whether the tag field 205 in the pointer structure 201 has the same tag value X as the tag field 215 of the control structure 211 corresponding to a pointed-to memory location. The logic is operative to prevent access (and in some versions to raise an exception) if the tag values are not the same.

In different embodiments, the allocation of the control structure can include allocating a small number of registers, e.g., one or more registers, allocating a small number of memory locations, e.g., one or two memory locations, or pre-defining registers or memory locations.

As compared to the use of a tag array shown in FIG. 1B, a single control structure is used for all the allocated memory 103. The control structure may be a small number of registers, e.g., one or two registers, or a small number of memory locations, e.g., one or two memory locations.

The tag value is assigned from a set of available tag values according to a tag-value-assigning method. Once a particular tag value is assigned, it is no longer in the set of available tag values. In one embodiment, the tag fields of the pointer structure 201 and control structure 211 are of fixed length, e.g., 8 bits. One embodiment assigns a random one of the set of available tag values. Another embodiment assigns tag values sequentially from the set of available tag values, e.g., as the next unassigned 8-bit value or as the next value from a list of available tag values.

Upon deallocation of the memory portion 103, the tag value X is made available to be (again) assigned and the control structure and pointer are freed up. Thus, in embodiments that use the value assigning method that includes assigning a tag value randomly, the freed-up tag value is made available, i.e., becomes (again) one of the set of available tag values. In an embodiment that uses the value-assigning method that includes assigning a tag value from a list of available tag values, when a tag is freed up, it is added to the end of the list of available tag values.

Embodiments of the invention use a data structure to store the control structures and a mechanism of pointing to a particular control structure within the data structure of control structures. In the simplest embodiments, the control structures are simply locations in memory and the mechanism of pointing to a particular control structure uses an address or part of an address. For convenience, a control structure may be forced to be an integer number of bytes long, such that the address of different control structures always has the pre-determined number of lowest significant bits and only part of the address is needed. In some such embodiments, the mechanism of pointing to a particular control structure uses a pre-determined number of the most significant bits of an address. Another set of the embodiment uses a table of control structures for the data structure of control structures and in such embodiments, the mechanism of pointing to a particular control structure uses an index to the table of control structures to point to a particular control structure. One of ordinary skill in the art can arrive at other mechanisms for pointing to a control structure without departing from the spirit and scope of the present invention.

In those embodiments that use a table of control structures and a mechanism of pointing to a particular control structure using an index, one embodiment includes a hardware register that points to the table. Another embodiment uses a pre-defined memory location for pointing to the table of control structures. If at some stage, there is an indication that a larger table is needed, it is then relatively simple to allocate a larger space for the table, copy the contents of the existing table to the larger table, and enter the address of the larger table in the register or pre-defined memory location that points to the control structure table. Alternate embodiments have a location in memory for the table of control structures and allow an included memory management system to control access to the table.

To allow for pointer arithmetic during execution of a program, the pointer 111 includes a field 203 called the offset field. To carry out arithmetic, an offset value is placed in the offset field 203 of the pointer 111. As shown in FIG. 2, to determine an address in the memory space 111, the offset value in field 203 is added to the address in MemPtr field 213 of the control structure 211 to carry out pointer arithmetic. In processor embodiments that include a validator, the validator also is operative during dereferencing to add the value in the offset field to the position that points to the portion 103 of memory and to further ascertain whether the tag field 205 in the pointer structure 201 has the same tag value X as the tag field 215 of the control structure 211 corresponding to a pointed-to memory location. The logic is operative to prevent access (and in some versions, to raise an exception) if the tag values are not the same.

Embodiments of the present invention that use an offset field in the pointer include a mechanism to ensure that carrying out pointer arithmetic does not lead to an out-of-bounds address. Some embodiments include an additional field 217, denoted MaxOff, and also the maximum-offset field in the control structure to indicate a limit to the offset to avoid an out-of-bounds address. Upon allocation, because the amount of memory being allocated is known, the maximum quantity, denoted MaxOff, allowed for an offset to the initial address in MemPtr field 213 is entered in the MaxOff field 217. When an offset is used in Offset field 203, a check is made to ensure that the offset does not exceed the maximum offset in Offset field 217.

Figure 3:
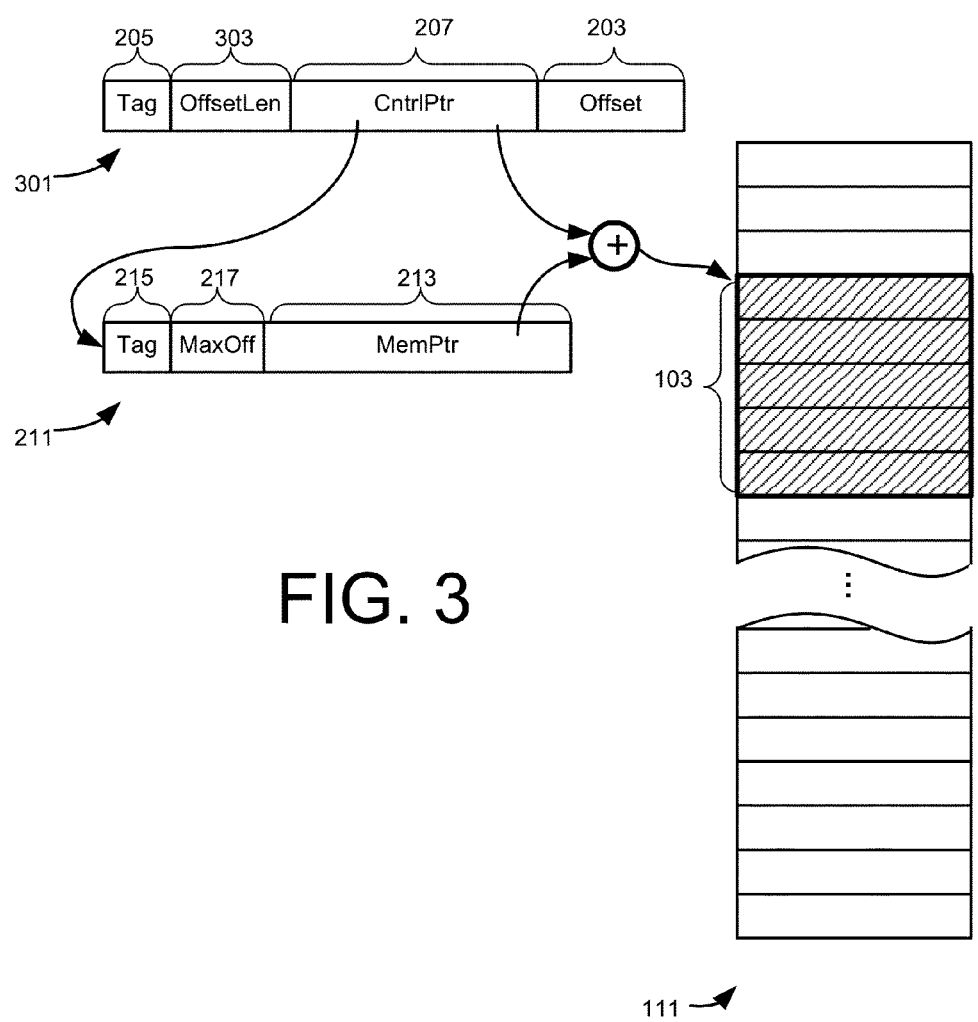
FIG. 3 is a simplified block diagram that shows elements of an alternate embodiment that allows for variable field lengths in a pointer structure.

While some embodiments of the present invention use one fixed size for the control structure pointer CntrlPtr 207 and another fixed size for the Offset field 203, an alternate set of embodiments provide for having fields of different lengths. FIG. 3 shows a pointer 301 that includes a field 303, denoted OffsetLen, that indicates the lengths of the CntrlPtr and Offset fields 207 and 203. In some embodiments, the OffsetLen field 303 is the first field after the Tag field 205. One version uses a fixed length, e.g., 6 bits, for the OffsetLen field 303 to indicate where in the pointer structure 301 the boundary is between the CntrlPtr field 207 and the Offset field 203. 6 bits provides a number between 0 and 63. Allowing 8 bits for the Tag field, 6 bits for the OffsetLen field 303, and another number of bits between 0 and 63 for the boundary typically provides sufficient flexibility. Alternate embodiments use different field sizes. Furthermore, those of ordinary skill in the art would understand that there are other mechanisms possible for indicating how many bits to allow for each of the ContrlPtr and Offset fields 207 and 203.

Embodiments of the invention that provide for variable-length Offset fields include a method of determining what size to use for the Offset field 203. The maximum Offset is determined by the size of the memory allocation, e.g., in bytes, which, when rounded up to the next power of 2, indicates how many bits to use for the Offset field 203.

When dereferencing an address, the pointer structure 201 (or 301) provides: (a) the location of the control field 211 that includes the MemPtr field 213 and (b) the offset to add to the address in the MemPtr field 213 to determine the address in memory. A check of the Offset field 203 to ensure that it does not exceed the maximum offset of MaxOff field 217 and a check of the tag fields 205 and 215 ensure the dereferencing leads to a valid address.

In some embodiments, one or more of the fields are defined to be entered from least-significant bits to most-significant bits rather than the least-significant bit being the last bit, i.e., right-most bit in the field. This can add to efficiency.

Figure 4:
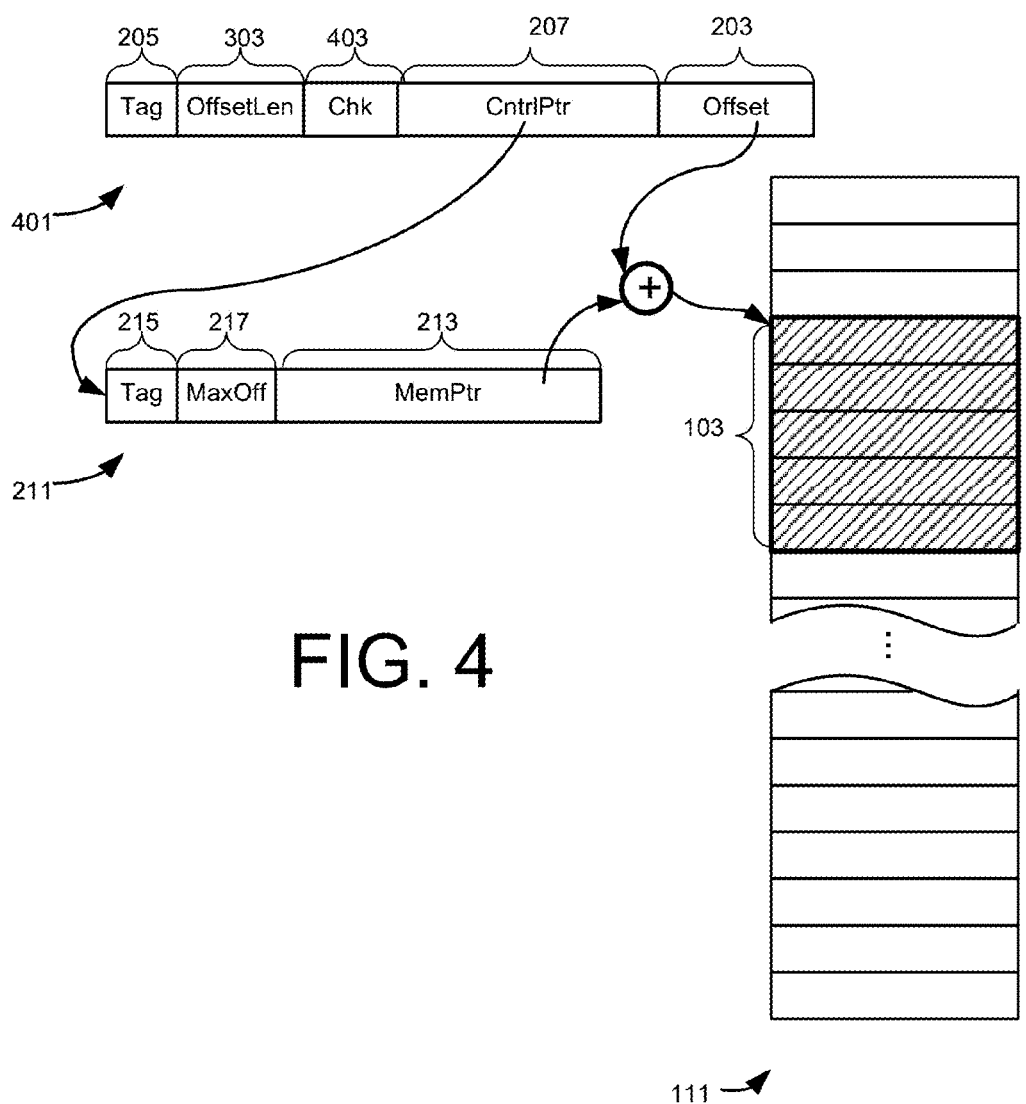
FIG. 4 is a simplified block diagram that shows elements of an alternate embodiment of the invention that includes an error-detecting field in a pointer structure.

Yet another set of embodiments includes an error-detection field, e.g., a checksum field, in the pointer structure. FIG. 4 shows a block diagram of a pointer structure 401 and a control structure 211 according to one such embodiment. The pointer structure 401 includes an error-detection field 403 that, at the time of allocation, is filled with an error-detection function of the contents of all the fields other than the Offset field 203. One example of an error detection function is a checksum which is denoted Chk in FIG. 4. If the pointer structure 401 later is filled with an offset that contains more bits than the number of bits provided for the offset field 203, then, upon an attempt at dereferencing, an error such as too large an offset being added can be detected by comparing the filled-in error-detection field 403 to a calculated function of the contents of all the fields other than the Offset field 203. In one embodiment of the processing system that includes the validator element, the validator element includes logic that also is operative, in addition to the other validation functions, to calculate the function of the contents of all the fields other than the offset field and to compare the filled in error-detection field 403 to the calculated function.

In some embodiments, the control structure is stored in memory at a location having a pre-defined relationship to the location of the memory portion 103. The control-structure-pointer field stores CntrlPtr, an address of the control structure's location or of the location of the memory portion 103, such that one address is sufficient to specify the location of the control structure and of the portion of memory 103.

Figure 5:
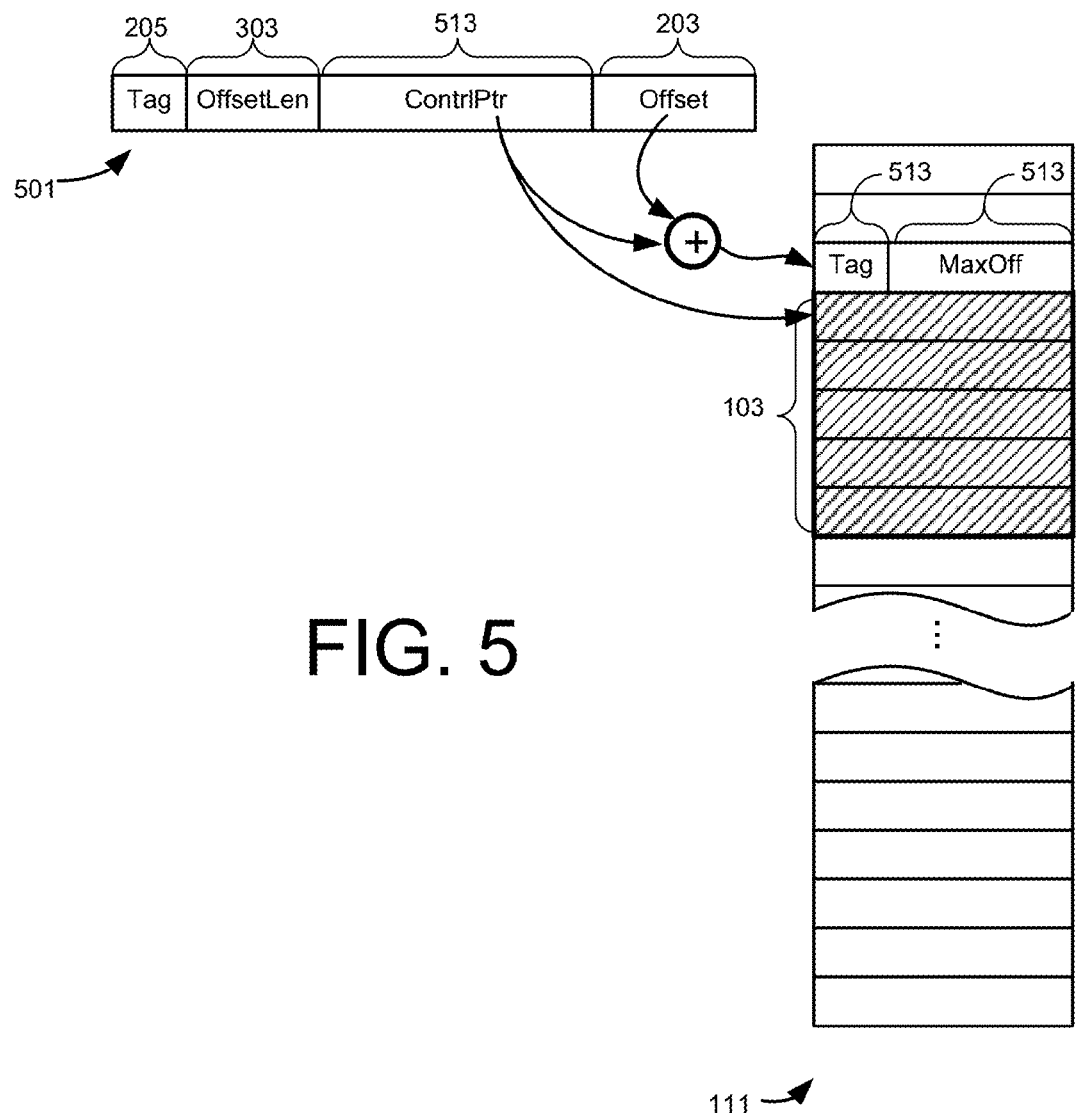
FIG. 5 shows a control structure and memory allocation arrangement of yet another set of embodiments of the invention.

FIG. 5 shows such a control structure and memory allocation arrangement. In FIG. 5, the set of fields forming the control structure are prepended to commence immediately before the allocated memory portion 103. Compared to the embodiments of FIGS. 2-4, less memory is required, the allocation logic is simpler, and caching behavior is improved. Rather than two address pointers, one for the allocated memory and another for the control structure, only one pointer, e.g., a control structure pointer 513 is used. Furthermore, the control structure does not need the MemPtr field (213) as there is a pre-defined relationship between the control structure location and the location of the allocated memory portion 103. In an alternate implementation, the pointer can point to the starting address of the allocated memory portion, since the portion's starting address and control structure location have the pre-defined relationship. One address is sufficient to specify the locations of both the control structure and the allocated portion of memory 103.

Note that in one version of such an embodiment, the pointer 501 does not include the error-detecting field because the tag field is sufficient to catch out-of-bound references. The CntrlPtr field 513 that that points to the control structure is located in pointer 501 immediately next to the beginning of the offset field 203, such that an offset value having more bits than allocated to the offset field 203 causes the contents of CntrlPtr field 513 to change, perhaps to a non-existent control structure location. If this points to a different control structure, it is likely that this different control structure will have a different tag. Therefore, assuming an 8-bit tag, a separate checksum to check if the bits other than the offset have changed is not necessary, assuming such a likelihood of having a different tag is good enough.

Dereferencing the pointer 501, as in the case of FIGS. 2-4, requires two memory accesses: one to check the tag and a second to fetch or store the actual data from or in the allocated memory portion.

Processing System Embodiments

Figure 6:
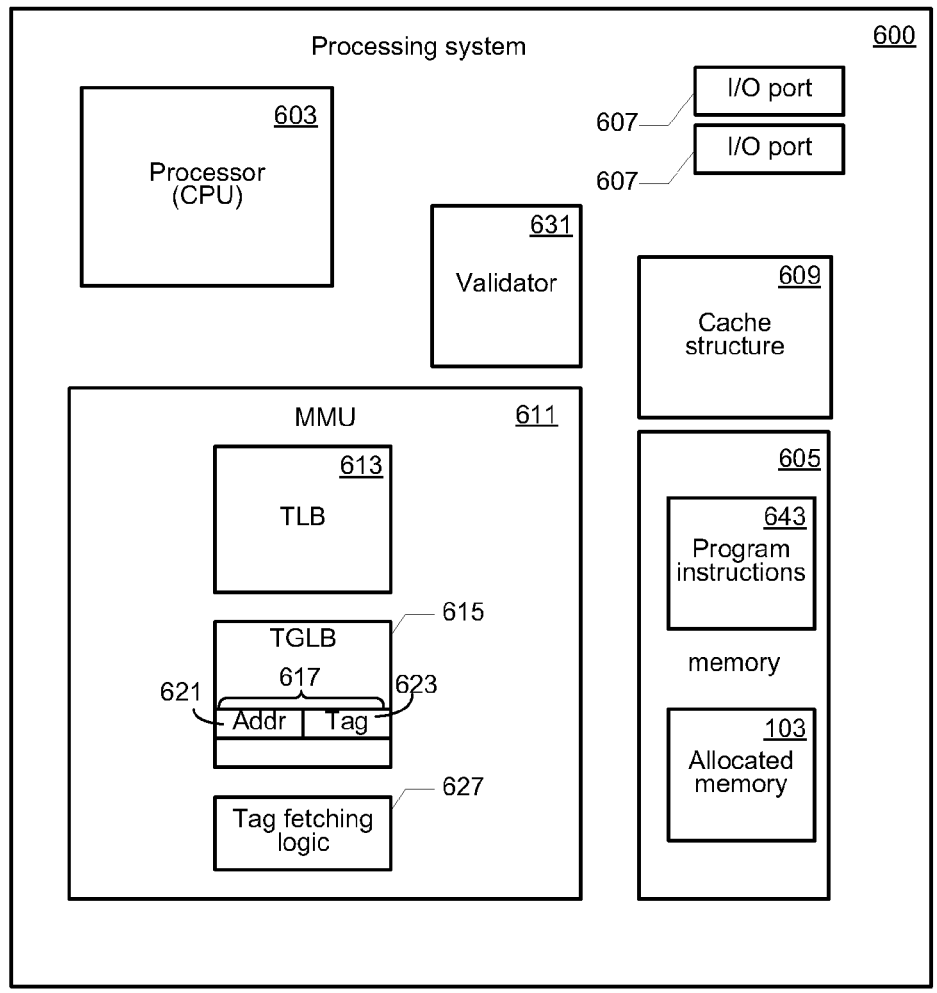
FIG. 6 shows a simplified block diagram of an example processing system 600 that includes an embodiment of the present invention.

The elements of FIGS. 2 to 5 and their above descriptions are applicable also to processing system embodiments of the present invention. FIG. 6 shows a simplified block diagram of an example processing system 600 that includes an embodiment of the present invention. Many elements and interconnections are omitted for the sake of clarity of exposition. The processing system 600 includes a processing unit (CPU) 603, memory 605, one or more input/output (I/O) device ports 631, and a cache structure 609 comprising one or more caches, for example a data cache (or D-cache) and/or an instruction cache (or I-cache). The processing system 600 also includes a memory management unit (MMU) 611 that converts virtual addresses into physical memory addresses and possibly into physical I/O device port addresses. The MMU 611 may include a translation lookaside buffer (TLB) 613 to improve the address translation performance of the MMU 611. A TLB is a hardware element that acts as a cache of recent translations and, in some versions, frequent translations, and stores virtual-memory page to physical-memory page translations in versions that use memory pages. Given a memory address, e.g., in an instruction to fetch data to load or to store data, the processing system includes logic that causes the MMU 611 to look first in the TLB 613 to determine whether the mapping of a virtual page to a physical page is already known. If so (a "TLB Hit"), the translation can be done quickly. If the mapping is not in the TLB 613 (a "TLB Miss"), the correct translation needs to be determined by the MMU. In some embodiments, the logic is embodied in a non-transitory computer-readable medium in the processing system.

The processing system 600 further comprises a validator element 631 that that is operative during dereferencing and that includes logic to ascertain whether the tag field 205 in the pointer structure 201 has the same tag value as the tag field 215 of the control structure 211 corresponding to a pointed-to memory location. The logic of the validator element 631 is operative to prevent access (and is some versions, to raise an exception) if the tag values are not the same. At least some of the logic of the validator element 631 is in one version embodied in a non-transitory computer-readable storage medium. Some or all of the logic of the validator element 631 is hard wired in one embodiment.

Some embodiments include a tag lookaside buffer (TGLB) in which are maintained entries for recently accessed addresses and the tag values for the recently accessed addresses. In some versions, the TGLB also includes entries for frequently accessed addresses. When a pointer address is to be checked as part of dereferencing, a lookup of the tag lookaside buffer provides, if there is a hit, the tag value for the control structure corresponding to the pointer address without need for a memory reference.

Thus, in some embodiments of the present invention, the MMU 611 includes a TGLB 615 to improve the speed of validating an address (pointer value plus offset) in the pointer structure for correctly dereferencing a pointed-to address. Use of a TGLB can, in many cases, avoid the need to access the tag field in the control structure in addition to accessing the pointed-to address, thus saving a memory reference. The TGLB 615 includes entries for recently accessed addresses and the tag values for those addresses. In some versions, the TGLB 615 also includes entries for frequently accessed addresses. An example TGLB entry 617 is shown in TGLB 615 and includes an address field 621 and a Tag field 623 that includes the tag for the address in the address field and in some embodiments the tag values of a pre-determined number of neighbors. When a pointer address is to be checked, a lookup is first made into the TGLB. If there is a hit (a "TGLB hit"), the correct tag value for the corresponding control structure is immediately obtained without need for another memory reference. Otherwise, if there is a miss, that is, if there is no element for the pointer address in the TGLB, tag fetching logic 627 included in the MMU causes the tag to be fetched from the control structure for the address. The address and the tag value are added as a new TGLB entry into the TGLB, possible by replacing an existing TGLB entry according to a TGLB replacement policy. Different embodiments use different TGLB replacement policies. One set of embodiments uses a least recently used (LRU) replacement policy.

In some embodiments, the pairs of addresses and address translations in the TLB and the pairs of addresses and tag translations in the TGLB are maintained incoherent of each other, while in other embodiments, the pairs in the TLB are maintained coherent with the pairs in the TGLB.

In another improvement, the TLB of the processing system is modified so that in addition to providing an address translation for a virtual address, the TLB also provides a tag value for the address. That is, in one embodiment, the TGLB is part of the TLB.

In different versions, the processing system 600 may be a separate microprocessor with the digital circuitry being external to the microprocessor, e.g., on a printed circuit board or elsewhere in the system, or may be a processor embedded in an application specific integrated circuit (ASIC) or a custom integrated circuit (IC) such as a very large scale integrated (VLSI) device, with the digital circuitry including some components that are part of the ASIC or IC and other components that are external to the ASIC or IC.

One embodiment includes a processing system (the processing system 600) comprising the memory 605, the processor 603, and logic that is configured to cause the processing system to assign a tag value for a portion of memory 103 that has been allocated and to enter the tag value for the portion 103 of memory in a tag field 205 included in a control structure (201, 301, 401 or 501, depending on the embodiment). The control structure's location or content is indicative of the location of the portion of memory.

In one version, the logic includes instructions, shown in program instructions 643, that when executed carry out one or more steps that form an embodiment of the invention. In another version, at least some of the logic is realized in hardware.

The tag value is used to determine access permission to the portion of memory during execution of an instruction of a computer program. The instruction uses a pointer provided by allocation of the portion of memory to determine access permission including comparing the contents of a tag field in the pointer with the tag value entered in the tag field of the control structure. The pointer also includes a control-structure-pointer field that points to the control structure.

In some embodiments, the pointer includes an offset field to provide carrying out pointer arithmetic by assigning an offset value in the offset field to modify the indication of the location of the portion of memory by the offset value using the control structure's location or content.

One version comprises an access validator 631 to determine, during execution of the instruction that uses the pointer, whether the contents of the tag field of the pointer match the value entered in the tag field of the control structure.

In some embodiments, the processing system 600 further comprises a storage element to store tag values for recently accessed addresses to accelerate determining access permission. In FIG. 6, the storage element comprises a TGLB 615. Furthermore, one embodiment includes a memory management unit comprising a TLB 613 to store virtual address-to-physical address translations. In one version, the TGLB is maintained coherently with the TLB and in another version, the TGLB is maintained incoherently with the TLB.

In one embodiment of the processing system, the control structure's location has a pre-defined relationship to the location of the portion of memory and the content in the control-structure-pointer field is an address of the control structure's location or of the location of the portion of memory.

In one embodiment, the control structure is stored in memory at a location having a pre-defined relationship to the location of the portion of memory and the content in the control-structure-pointer field is an address of the control structure's location or of the location of the portion of memory, such that one address is sufficient to specify the location of both the control structure and the portion. In one particular version, the control structure is prepended to commence immediately before the portion of memory. In one embodiment, the control-structure-pointer field is located immediately next to the beginning of the offset field, such that an offset value having more bits than allocated to the offset field causes the contents of the control-structure-pointer field to change.

Machine-Readable Medium Embodiments

One embodiment includes a non-transitory machine-readable medium, e.g., memory 605 having stored therein instructions, e.g., in 643, that when executed by a processor, e.g., 603 of the processing system 600 that includes the memory 605, cause the processing system to carry a method. The method in some versions is of allocating memory, as described above with the aid of FIGS. 2-5. One method comprises a determining step carried out when executing an instruction on the processing system. The instruction uses a pointer for an allocated portion 103 of memory and includes dereferencing of a memory address in the allocated portion 103. The pointer includes a tag field and a control-structure-pointer field. The determining step determines if a tag value in the tag field of the pointer matches a corresponding tag value entered in a corresponding tag field in a control structure. The control-structure-pointer field points to the control structure. The control structure's location or content is indicative of the location of the allocated portion of memory. The method comprises preventing access to the memory address if a match does not occur.

Consistent with FIGS. 2-5 and their description herein above, in one embodiment, the pointer includes an offset field to provide carrying out pointer arithmetic during the execution of the instruction that uses the pointer. Carrying out the pointer arithmetic includes assigning an offset value in the offset field to modify the indication of the location of the portion of memory by the offset value using the control structure's location or content.

In one version, the control structure includes a memory-pointer field that points to an address.

In one embodiment, the determining step comprises looking up a TGLB that includes entries for recently accessed addresses and tag values for the recently accessed addresses. The looking up is to obtain, if there is a hit, the tag value for the control structure corresponding to the dereferenced memory address without need for a memory reference.

In one embodiment, the control structure includes a memory-pointer field that points to an address and the control structure further includes a maximum-offset field to indicate a limit to the offset. The method further comprises checking the contents of the offset and maximum-offset fields to ensure the limit of the offset is not exceeded and preventing access to the memory address if the limit is exceeded.

In one embodiment, the control structure is stored in a data structure of control structures and the contents of the control-structure-pointer field points to an entry of the data structure of control structures.

In one embodiment, the control structure is stored in memory allocated for control structures and the contents of the control-structure-pointer field include an address or part thereof.

Further variations are as described above with the aid of FIGS. 2-5.

General

Unless specifically stated otherwise, as apparent from the following description, it is appreciated that throughout the specification, discussions utilizing terms such as "processing," "computing," "calculating," "determining" or the like, may refer to, without limitation, the action and/or processes of hardware, e.g., an electronic circuit, a computer or computing system, or a similar electronic computing device that manipulates and/or transforms data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," or a "computing platform" may include one or more processors.

Note that when a method is described that includes several elements, e.g., several steps, no ordering of such elements, e.g., of such steps, is implied, unless specifically stated.

The methodologies described herein are, in some embodiments, performable by a processing system comprising one or more processors that accept logic in the form of instructions encoded in one or more non-transitory computer-readable media. When executed by one or more of the processors, the instructions cause carrying out of at least one of the methods described herein. Any processor is included that is capable of executing a set of instructions (sequential or otherwise) that specify actions to be taken, includes memory, and executes instructions that use a pointer for allocated memory. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium which may include memory embedded in a semiconductor device or a separate memory subsystem including main RAM and/or a static RAM, and/or ROM, and cache memory. The storage subsystem may further include one or more other storage devices such as magnetic and/or optical and/or other solid-state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device and a network interface device.

In some embodiments, a non-transitory computer-readable medium is configured with, e.g., encoded with instructions, e.g., logic that when executed by one or more processors of a processing system such as a digital signal processing device or subsystem that includes at least one processor element and a storage subsystem, causes carrying out a method as described herein. Some embodiments are in the form of the logic itself. A non-transitory computer-readable medium is any computer-readable medium that is statutory subject matter under the patent laws applicable to this disclosure, including Section 101 of Title 35 of the United States Code. A non-transitory computer-readable medium is, for example, any computer-readable medium that is not specifically a transitory propagated signal or a transitory carrier wave or some other transitory transmission medium. The term "non-transitory computer-readable medium" thus covers any tangible computer-readable storage medium. In a typical processing system as described above, the storage subsystem thus includes a computer-readable storage medium that is configured with, e.g., encoded with, instructions, e.g., logic, e.g., software, that when executed by one or more processors, cause carrying out one or more of the method steps described herein. The software may reside in the hard disk or may also reside, completely or at least partially, within the memory, e.g., RAM, and/or within the processor registers during execution thereof by the computer system. Thus, the memory and the processor registers also constitute a non-transitory computer-readable medium on which can be encoded instructions to cause, when executed, carrying out method steps. Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media include dynamic memory, such as main memory in a processing system, and hardware registers in a processing system.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium, may form a computer program product or be included in a computer program product.

In alternative embodiments, the one or more processors operate as a stand-alone device or may be connected, e.g., networked to other processor(s), in a networked deployment or the one or more processors may operate in the capacity of a server or a client machine in a server-client network environment or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a Personal Digital Assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described, in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., embodied in a non-transitory computer-readable medium, or a non-transitory computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment, or an embodiment combining software and hardware aspects.

As used herein, the terms "machine-readable" and "computer-readable" are synonymous.

It will also be understood that embodiments of the present invention are not limited to any particular implementation or programming technique and that the invention may be implemented using any appropriate technique for implementing the functionality described herein. Furthermore, embodiments are not limited to any particular programming language or operating system.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent from this disclosure to one of ordinary skill in the art.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects may lie in fewer than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for carrying out the invention.

In the description provided herein, numerous specific details are set forth. However, it is understood that embodiments of the invention may be practiced without these specific details. In other instances, well-known methods, structures, and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the memory portions so described must be in a given sequence, either temporally, spatially, in ranking, or in any other manner.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms "comprising," "comprised of," or "which comprises" is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms "including" or "which includes" or "that includes" as used herein is also an open term that also means including at least the elements/features that follow the term, but not excluding others. Thus, including is synonymous with and means comprising.

Similarly, it is to be noticed that the term "coupled," when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply the direction of coupling. Hence, the expression "a device A is coupled to a device B" may be synonymous with the expression "a device B is coupled to a device A." "Coupled" may mean that two or more elements are either in direct physical or electrical contact or that two or more elements are not in direct contact with each other, but still cooperate or interact with each other.

In addition, use of the "a" or "an" are used to describe elements and components of the embodiments herein. This is done merely for convenience and to give a general sense of the invention. This description should be read to include one, or at least one, element or component and the singular includes the plural unless it is obvious that it is meant otherwise.

Thus, while what are believed to be the preferred embodiments of the invention have been described, those skilled in the art will recognize that other and further modifications may be made thereto without departing from the spirit of the invention and it is intended to claim all such changes and modifications, as fall within the scope of the invention, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described within the scope of the present invention.

The invention claimed is:

1. A method in a processing system that includes a memory, the method comprising:
   (a) carrying out memory allocation of a portion of memory of the processing system, the memory allocation comprising:
   (i) providing a pointer mechanism for the allocated portion of memory, the pointer mechanism being for pointing to locations in the allocated portion of memory, and comprising:
       a pointer including a first tag field and a control-structure-pointer field and
       a control structure including a second tag field and at least one additional field;
   (ii) assigning the content of the control structure pointer field to point to the control structure, wherein the control structure's location or content provides an indication of the location of the assigned portion of memory;
   (iii) assigning a tag value for the portion of memory from a set of available tag values, the assigning using a tag-value-assigning method; and
   (iv) entering the assigned tag value in the first and second tag fields of the pointer mechanism; and (b) dereferencing a memory address using the pointer mechanism, the dereferencing including ascertaining whether there is a match in the respective contents of the first and second tag fields of the pointer structure, and only granting access permission to the memory address if the ascertaining produces a match, wherein deallocating the allocated portion of memory comprises including the assigned tag value in the set of available tag values, such that said previously assigned tag value may be re-assigned.

2. A method as recited in claim 1, wherein the pointer of the pointer mechanism includes an offset field to provide carrying out pointer arithmetic during execution of an instruction that uses the pointer mechanism, the pointer arithmetic defined by assigning an offset value in the offset field to modify by the offset value the indication of the location of the portion of memory using the control structure's location or content.

3. A method as recited in claim 2, wherein the control structure of the pointer mechanism includes a memory-pointer field that points to an address.

4. A method as recited in claim 3, wherein the memory allocation further comprises:

maintaining in a tag lookaside buffer entries for recently-accessed addresses that are in the allocated portion of memory and for the tag values for the recently-accessed addresses in the allocated portion of memory, wherein the ascertaining comprises looking up the tag lookaside buffer and if there is a hit, using the tag value in the lookaside buffer as the tag value for the control structure of the pointer mechanism corresponding to the memory address being dereferenced.

5. A method as recited in claim 4, wherein the memory allocation further comprises:

maintaining in a translation lookaside buffer entries for recently-accessed virtual addresses and address translations from the virtual addresses to memory addresses.

6. A method as recited in claim 2, wherein the control structure of the pointer mechanism is stored in a data structure of control structures and the contents of the control-structure-pointer field points to an entry of the data structure of control structures.

7. A method as recited in claim 2, wherein the control structure of the pointer mechanism is stored in memory allocated for control structures and the contents of the control-structure-pointer field is an address or part thereof.

8. A method as recited in claim 2, wherein the control structure of the pointer mechanism is stored in a table of control structures and the contents of the control-structure-pointer field is an index for the table of control structures.

9. A method as recited in claim 2, wherein the pointer of the pointer mechanism further includes a size field to indicate the size of the offset field, such that different pointer mechanisms may have offset fields having different sizes.

10. A method as recited in claim 2, wherein the pointer includes an error-detection field, wherein the memory allocation further comprises filling the error-detection field with an error detection function of the contents of all the fields other than the offset field, and wherein dereferencing includes comparing the contents of the error-detection field with a calculated function of all fields of the pointer other than the offset field in order to detect an error.

11. A processing system comprising:

at least one processor;

a non-transitory computer-readable medium including a memory; and instructions in the non-transitory computer-readable medium, the instructions configured when executed to cause the processing system to:

(a) carry out memory allocation of a portion of memory of the processing system, the memory allocation comprising:

(i) providing a pointer mechanism for the allocated portion of memory, the pointer mechanism being for pointing to locations in the allocated portion of memory, and comprising:

a pointer including a first tag field and a control-structure-pointer field, and a control structure including a second tag field and at least one additional field, and (ii) assigning the content of the control structure pointer field to point to the control structure, wherein the control structure's location or content provides an indication of the location of the assigned portion of memory;

(iii) assigning a tag value for the portion of memory from a set of available tag values, the assigning using a tag-value-assigning method;

(iv) entering the assigned tag value for the portion of memory in the first and second tag fields, (b) dereferencing a memory address using the pointer mechanism, the dereferencing comprising ascertaining whether there is a match in the respective contents of the first and second tag fields of the pointer structure, and only granting access permission to the memory address if the ascertaining produces a match, wherein deallocating the allocated portion of memory comprises including the assigned tag value in the set of available tag values, such that said previously assigned tag value may be re-assigned.

12. A processing system as recited in claim 11, wherein the pointer of the pointer mechanism includes an offset field to provide carrying out pointer arithmetic by assigning an offset value in the offset field to modify the indication of the location of the portion of memory by the offset value using the control structure's location or content.

13. A processing system as recited in claim 12, further comprising:

a storage element to store tag values for recently-accessed addresses in order to accelerate the determining of access permission.

14. A processing system as recited in claim 13, wherein the storage element comprises a tag lookaside buffer.

15. A processing system as recited in claim 12, further comprising an access validator to determine, during execution of an instruction that uses the pointer mechanism, whether the contents of the first tag field match the value entered in the second tag field.

16. A processing system as recited in claim 12, wherein the pointer of the pointer mechanism includes an error-detection field, wherein the memory of allocation comprises filling the error-detection field with an error detection function of the contents of all the fields other than the offset field, such that upon an attempt at dereferencing, an error is detected by comparing the contents of the error-detection field with a calculated function of all fields of the pointer structure other than the offset field.

17. A processing system as recited in claim 12, wherein the control structure's location has a pre-defined relationship to the location of the portion of memory, and the content in the control-structure-pointer field is an address of the control structure's location or of the location of the portion of memory.

18. A processing system as recited in claim 12, wherein the control structure is stored in memory at a location having a pre-defined relationship to the location of the portion of memory and wherein the content in the control-structure-pointer field is an address of the control structure's location or of the location of the portion of memory, such that one address is sufficient to specify the location of the control structure and of the allocated portion of memory.

19. A non-transitory computer-readable medium having stored therein instructions that when executed by a processor of a processing system that includes memory cause the processing system to carry out a method comprising:
  (a) carrying out memory allocation of a portion of memory of the processing system, the memory allocation comprising:
  (i) providing a pointer mechanism for the allocated portion of memory, the pointer mechanism being for pointing to locations in the allocated portion of memory, and comprising:
    a pointer including a first tag field and a control-structure-pointer field, and
    a control structure including a second tag field and at least one additional field;
  (ii) assigning the content of the control structure pointer field to point to the control structure, wherein the control structure's location or content provides an indication of the location of the assigned portion of memory;
  (iii) assigning a tag value for the portion of memory from a set of available tag values, the assigning using a tag-value-assigning method; and
  (iv) entering the assigned tag value in the first and second tag fields of the pointer mechanism; and
  (b) dereferencing a memory address using the pointer mechanism, the dereferencing including ascertaining whether there is a match in the respective contents of the first and second tag fields of the pointer structure, and only granting access permission to the memory address if the ascertaining produces a match,
  wherein deallocating the allocated portion of memory comprises including the assigned tag value in the set of available tag values, such that said previously assigned tag value may be re-assigned.

20. A non-transitory computer-readable medium as recited in claim 19, wherein the pointer of the pointer mechanism includes an offset field to provide carrying out pointer arithmetic during the execution of an instruction that uses the pointer mechanism, the carrying out of pointer arithmetic including assigning an offset value in the offset field to modify, using the offset value, the location indicated by the control structure's location or content.

* * * * *